J. D. Gray,
Oil Can.

No. 100,393.   Patented Mar. 1, 1870.

Attest,
Peter H. Scott.
Joseph D. Grim.

John D. Gray
by his attorneys
Knight Bros.

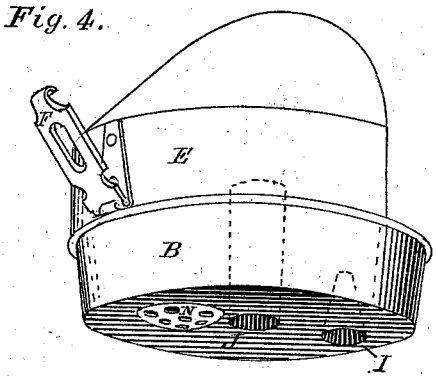
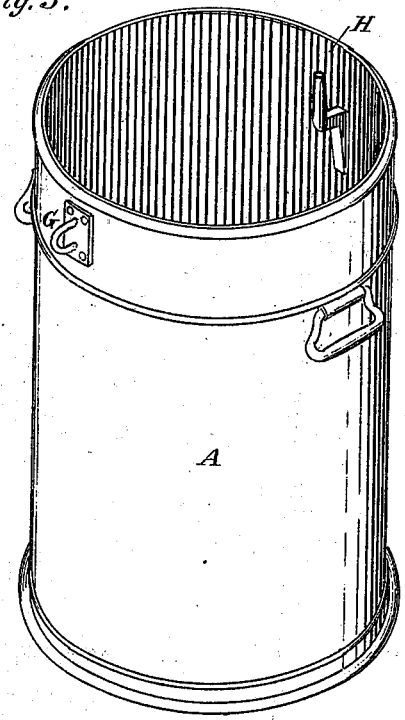
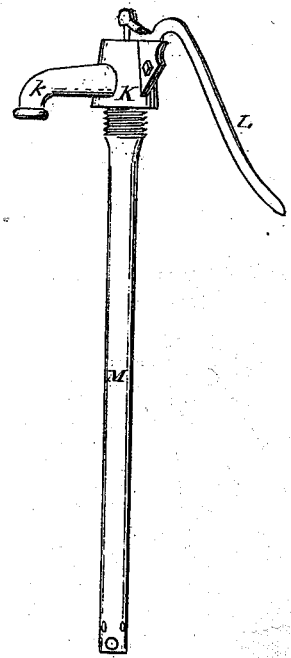

United States Patent Office.

JOHN D. GRAY, OF CINCINNATI, OHIO.

Letters Patent No. 100,393, dated March 1, 1870.

IMPROVEMENT IN OIL-CANS.

The Schedule referred to in these Letters Patent and making part of the same.

*To all whom it may concern:*

I, JOHN D. GRAY, of Cincinnati, in the county of Hamilton, and State of Ohio, have invented a certain Oil-Can or Reservoir, for the use of store-keepers and others, of which the following is a specification.

My invention is an improvement in the class of oil-receptacles for supplying smaller cans or other vessel; and My invention consists—

First, in making the cylindrical reservoir or can proper entirely open at the top, to receive a pan, adapted to fit down in, and close the mouth of the can, said pan being provided with the customary cover and sink, and with a suitable pump.

Second, the provision in said pan of a stand-pipe, within which the pump is screwed.

Third, the provision in said pump of a lever instead of a "T" handle.

Fourth, the provision of a guide-pin and socket for enabling the pan to be adjusted accurately in place.

Figures 3 and 4 show the reservoir and pan-cover detached.

Figure 5 shows my pump detached.

Figure 1:
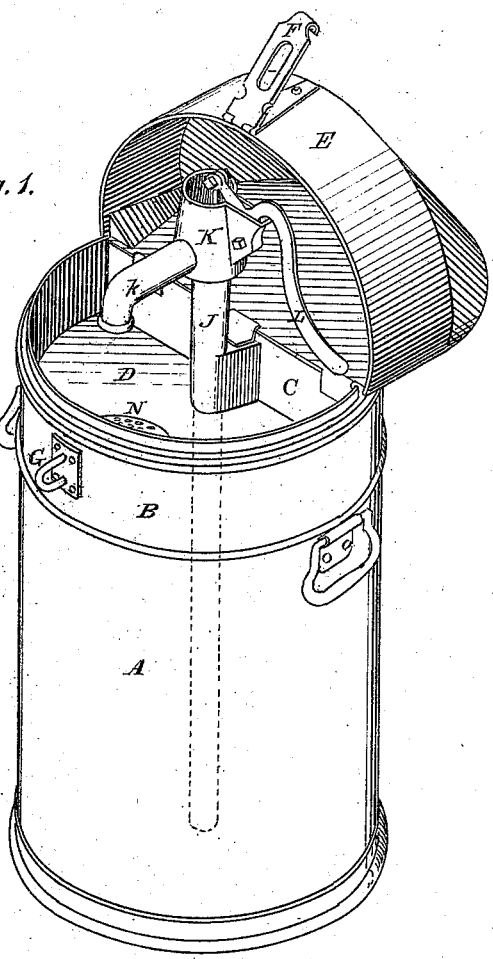
Figure 1 is a perspective view of a can embodying my improvements, the cover being thrown open.
Figure 2:
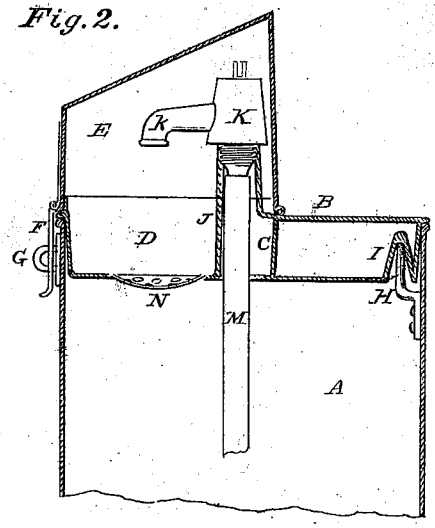
Figure 2 is a vertical section of the same, with the cover closed.

A represents the reservoir or body of my can, the same having an open mouth, which, when in use, is closed by a circular pan, B, which is divided into two unequal compartments by a partition, C, the larger compartment D being open at the top, but capable of being closed by a box-cover, E, that is hinged to top of the pan, immediately over the partition C, and whose lower edge closes down outside the rim $b$ of the pan.

F is a hasp upon the cover, which, when the latter is closed, receives a staple, G, on the body.

In order that the pan, when inserted in the body, may be guided accurately to its place, so that the hasp shall always coincide with the staple, I provide on the inside of the body an upwardly-projecting pin, H, which enters a conical socket, I, in the bottom of the pan.

Rising from the bottom of the pan, near its center, is a stand-pipe, J, which is screw-threaded interiorly, to receive the correspondingly screw-threaded barrel K, of a lever-pump, L.

The said barrel K has a customary bib-spout, $k$, and has the suction-pipe M soldered or otherwise firmly attached to its lower end.

Underneath the spout $k$ there is provided a customary sink, N, in the pan bottom, for conducting back into the reservoir the drippings of the vessels.

By lifting the pan, the interior of the reservoir is rendered accessible for cleaning or otherwise, and the same pan, with its appurtenances of pump, &c., may be shifted to another reservoir, when desired.

I claim as my invention—

1. An open-mouthed oil-can or reservoir, A, closed by the removable pan B, in combination with the screw-threaded stand-pipe J, pump K, and lever L, for the purposes designated.

2. The arrangement of the guide-pin H and the socket I, in the removable pan or cover D, as and for the object specified.

In testimony of which invention I hereunto set my hand.

JOHN D. GRAY.

Witnesses:
GEO. H. KNIGHT,
JOHN G. DOUGELS.